G. W. WATTS.
DOMESTIC COOKING VESSEL.
APPLICATION FILED JAN. 13, 1921.
1,399,094.
Patented Dec. 6, 1921.
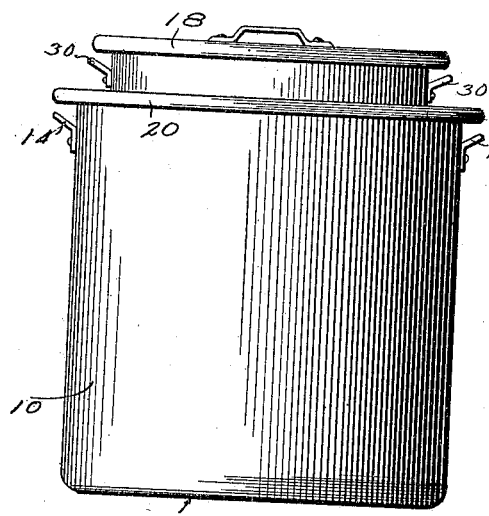
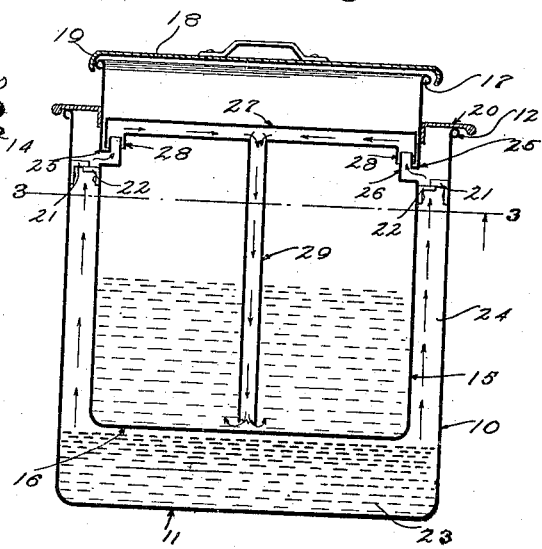
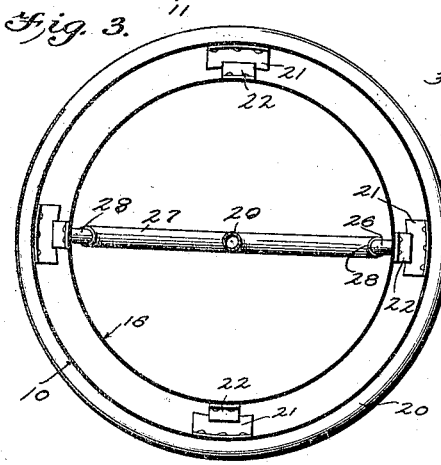
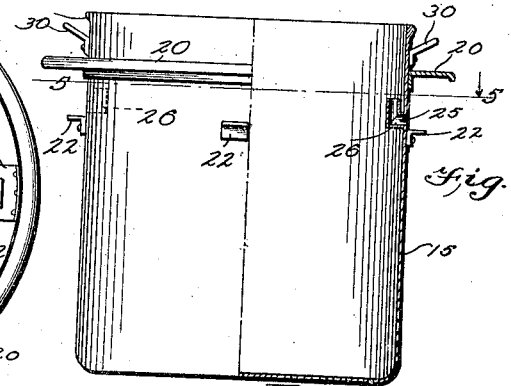
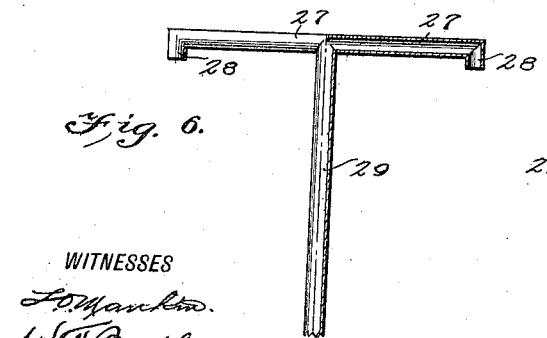
WITNESSES
INVENTOR
G. W. Watts,
BY
ATTORNEYS

UNITED STATES PATENT OFFICE.

GEORGE WILBER WATTS, OF HOT SPRINGS, ARKANSAS.

DOMESTIC COOKING VESSEL.

1,399,094.  Specification of Letters Patent.  Patented Dec. 6, 1921.

Application filed January 13, 1921. Serial No. 436,952.

*To all whom it may concern:*

Be it known that I, GEORGE WILBER WATTS, a citizen of the United States, and a resident of Hot Springs, in the county of Garland and State of Arkansas, have invented certain new and useful Improvements in Domestic Cooking Vessels, of which the following is a specification.

The present invention relates in general to domestic cooking vessels, and more particularly to a steam cooker of this character.

The object of the invention is to provide a domestic cooking vessel of this character which is of simple and durable construction, reliable in operation and easy and inexpensive to manufacture, which is highly efficient in use in that it conveys the steam from the generating chamber to the container for the substance being cooked without exposing the steam to the possibility or danger of being condensed and which delivers the steam to the bottom of the container whereby the steam rises upwardly through the substance to thereby not only cook but also to enhance the delectable qualities of the substance and which provides for the ready association and disassociation of the elements of the cooker.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a side elevational view of the cooker;

Fig. 2 is a transverse vertical sectional view thereof;

Fig. 3 is a transverse horizontal sectional view on line 3—3 of Fig. 2, looking in the direction of the arrow;

Fig. 4 is a detail view, partly in section and partly in elevation of the inner boiler;

Fig. 5 is a transverse vertical sectional view thereof on line 5—5 of Fig. 4, looking in the direction of the arrow; and Fig. 6 is a detail view, partly in elevation of the steam conductor.

Referring to the drawings wherein for the sake of illustration is shown the preferred embodiment of the invention, the outer boiler or vessel is designated at 10 and is constructed of any suitable material, preferably metal. The vessel is preferably of cylindrical construction having an integral imperforate bottom 11 and having its upper end open and the material of the vessel around the marginal open end spun or rounded, as shown at 12 in Fig. 2. Suitable handles 14 are provided on the outer boiler. An inner boiler or container 15 is provided, and is also preferably constructed of metal. The inner boiler is of substantially cylindrical construction and has an integral imperforate bottom 16 and its upper open end rolled, as at 17, to accommodate a cover 18 having a curved marginal flange 19 coöperable with the rolled marginal edge 17 to retain the cover in closed snug fitting relation on the inner container.

The inner container is arranged in the outer vessel and is supported in position therein by means of an annular laterally extending flange 20 secured to the outer wall of the inner container adjacent the upper end thereof and adapted to rest upon the rolled end 12 of the outer vessel to support the inner container in position and to close the open end of the outer vessel. Interlocking means is provided for retaining the outer vessel or boiler and container in proper relation and preferably consists of angle brackets 21 secured to the inner wall of the outer vessel and angle bracket 22 secured to the outer wall of the inner vessel and adapted to engage under the angle brackets 21 to interlock the vessel and to retain them in proper relation. It is obvious that in assembling the vessel, the inner container 15 is inserted within the outer vessel with the angle brackets 22 out of alinement or spaced horizontally from the angle brackets 21 and after the container 15 has been fully inserted in the outer vessel it is then rotated until its angle brackets 22 underlie the brackets 21 and effect the interlocking action.

The inner container, as shown clearly in Fig. 2, terminates a substantial distance from the bottom of the outer vessel 10 and the space between the bottom of these vessels constitutes a water chamber designated at 23. Preferably the water level is below the bottom 16 of the container. The space above the water level and the space defined between the side walls or cylindrical walls of the outer and inner vessels constitute a steam chamber which is designated at 24 into which the steam generated from the water 23 rises.

The inner vessel 15 is provided with steam inlet ports 25 which communicate with the steam chamber 24 and with steam inlets 26 in the form of elbows arranged within the container 15 and extending upwardly in the container. Means is provided for conducting the steam from the steam inlets 26 to adjacent the lower end of the container 15 and preferably comprises a steam conductor having the general form of a T-connection and including horizontal pipes 27 terminating at their ends in downwardly extending sleeves 28 adapted to embrace the upwardly extending portion of the elbows to thereby support the steam conductor and to connect it with the steam inlets. The horizontal pipes 27 communicate at their inner ends and centrally of the container 15 with the vertical depending pipe 29 which extends from the horizontal pipes downwardly through the container to a point adjacent the bottom thereof. The steam conductor thus receives the steam from the steam chamber 24 and delivers it to the lower end of the container 15 without exposing it to the liability of condensing and without in anywise impairing the steam. From the lower end or delivery end of the pipe 29 the steam is discharged in all directions and then rises upwardly through the container.

In practice, the outer vessel or boiler 10 is first filled with water to approximately the level shown in Fig. 2. Substance to be cooked is placed in the container 15, the steam conductor having been first arranged therein. This container is then lifted by the flange 20 or by handles 30 and inserted in the outer vessel or boiler in the manner hereinabove described and is locked in this position by means of the angle brackets 21 and 22. The annular flange 20 then serves not only to support the inner container in place but also serves to seal the steam chamber 24. The cover 18 is then placed on the inner container and the cooker is then ready to be placed on the stove or the like. The steam that is generated from the water rises in the chamber 24 and flows from the chamber through the inlet ports 25, the inlets 26, and the steam conductor 27 to the delivery end of the pipe 29 from whence it is diffused in the container and thus cooks the substance therein.

I claim:

1. A steam cooker comprising an outer boiler adapted to contain water, a container arranged within said outer boiler and defining therewith a steam space and having inlet ports communicating with said steam space, an annular flange fixed to the outer wall of said container and engaging the top of said outer boiler to seal the steam space and to support said inner boiler, interlocking means for maintaining said boilers in assembled relation including coacting angle brackets, elbows arranged in said inner container and communicating with said steam ports, and means for conducting said steam from said elbows to the lower end of said container comprising horizontal pipes having sleeves embracing said elbows and a vertical depending pipe communicating with said horizontal pipes and having its delivery end disposed adjacent the bottom of said container.

2. A steam cooker comprising an outer boiler adapted to contain water, a container arranged within said outer boiler and defining therewith a steam space and having inlet ports communicating with said steam space, an annular flange fixed to the outer wall of said inner boiler and engaging the top of said outer boiler to seal the steam space and to support said inner boiler, elbows arranged in said inner container and communicating with said steam ports, and means for conducting said steam from said elbows to the lower end of said container comprising horizontal pipes having sleeves embracing said elbows and a vertical depending pipe communicating with said horizontal pipes and having its delivery end disposed adjacent the bottom of said container.

3. A steam cooker comprising an outer boiler adapted to contain water, a container arranged within said outer boiler and defining therewith a steam space and having inlet ports communicating with said steam space, means for supporting said container on said outer boiler and for sealing the steam space, elbows arranged in said inner container and communicating with said steam ports, and means for conducting said steam from said elbows to the lower end of said container comprising horizontal pipes having sleeves embracing said elbows and a vertical depending pipe communicating with said horizontal pipes and having its delivery end disposed adjacent the bottom of said container.

4. A steam cooker of the character described comprising an outer boiler, a container arranged in said outer boiler and defining therewith a steam space, an imperforate annular flange carried by the outer wall of said container and engaging the top of said outer boiler to support the container and seal the steam space, interlocking means carried by the container and the outer boiler for maintaining the container and the boiler assembled, and means for conducting steam from the steam space into said container.

GEORGE WILBER WATTS.